United States Patent

[11] 3,590,694

| [72] | Inventors | Robert C. Prescott;<br>Hoel L. Bowditch, both of Foxboro, Mass. |
|---|---|---|
| [21] | Appl. No. | 772,787 |
| [22] | Filed | Nov. 1, 1968 |
| [45] | Patented | July 6, 1971 |
| [73] | Assignee | The Foxboro Company<br>Foxboro, Mass. |

[54] PRESSURE DEVICE HAVING LAYERED CONSTRUCTION AND PIVOTING SEAL WITH OPERATOR
31 Claims, 8 Drawing Figs.

[52] U.S. Cl............................................. 92/100,
  73/388, 73/406, 251/317, 137/82, 137/85
[51] Int. Cl............................................. F16j 3/00
[50] Field of Search............................ 92/100,
  103, 47, 98, 103 SD, 103 M; 73/388 BN, 406;
  137/82, 85, 81.5; 251/317

[56] References Cited
UNITED STATES PATENTS

| 1,489,349 | 4/1924 | Hampton.................... | 92/103 X |
| 2,444,163 | 6/1948 | Kocmich..................... | 92/100 X |
| 2,593,602 | 4/1952 | Pool et al.................... | 92/100 X |
| 2,616,442 | 11/1952 | Holmes....................... | 92/100 X |
| 2,883,995 | 4/1959 | Bialous et al................ | 73/406 X |
| 3,433,133 | 3/1969 | Brewer et al................ | 92/100 |
| 3,456,669 | 7/1969 | Lloyd.......................... | 73/388 X |

FOREIGN PATENTS

| 1,189,733 | 3/1965 | Germany..................... | 73/406 |

Primary Examiner—Martin P. Schwadron
Assistant Examiner—Leslie J. Payne
Attorney—Bryan, Parmelee, Johnson & Bollinger ABSTRACT: In a multilayer sandwiched-type of construction, an operator activated by at least one pressure chamber is brought through a sealing configuration which also provides for pivoting of the operator; the operator itself is formed from a layer of the sandwiched construction and the sealing at the operator pivot is formed from sealing layers of the sandwiched construction; the operator layer may be backed by a resilient sheet layer for sealing the pressure chamber actuating the operator; this construction may be readily adapted to a plurality of pressure chambers employed in conjunction with motion-sensing devices, or alternatively weight and springs, to perform the functions of alarms, relays, repeaters, amplifiers, and a variety of other pneumatic devices.

PRESSURE DEVICE HAVING LAYERED CONSTRUCTION AND PIVOTING SEAL WITH OPERATOR

This invention relates to pneumatic on fluidic devices and more particularly to a sandwiched construction employing an operator in conjunction with at least one pressure chamber, the operator being brought out through a sealing configuration formed from sandwiched layers in the construction, which arrangement forms the basis of a variety of pneumatic applications, performing functions of amplifiers, relays, alarms and the like.

This invention provides, in a sandwiched layered construction, for an operator being brought through a pivoting sealing arrangement, the pivoting and sealing being integral with the particular form of layered construction employed. Advantages of this construction, as compared with the construction of prior art devices in general, are the relative low cost of fabricating pneumatic devices with this arrangement, the relative smaller size of devices obtainable through this manner of construction, and the simplicity of the construction in terms of number of total parts and ease of fabricating each component layer. The components of the sandwiched construction are in general easily made by etching or stamping processes, whereby large numbers may be fabricated at economical low cost.

Embodiments of the invention are suitable for a variety of pneumatic functions, and are readily adaptable for any reasonable requisite high gain for the application desired. The pressure chambers formed from the sandwiched construction of the invention may have as small a volume as is consonant with fast response and large effective area. Bellows-type devices, for example, have definite limitations in the ratio of effective area to volume, while the present invention increases the practically achievable ratio without raising the spring rate. In addition, as compared with bellows-type devices, the sandwiched construction of the invention inherently provides for a matching of the effective areas of a pair of pressure chambers separated by the pivoted operator layer. Embodiments of the invention are highly accurate when employed as nulling devices in feedback types of applications. In addition, embodiments of the invention may be employed with high or low output impedance devices as required; for example, by choice of the throttling mechanisms employed, whether a nozzle-flapper arrangement for limited delivery, or high delivery means such as are employed in pneumatic relays.

Other objects and advantages of the invention will be apparent from the following specification together with the various FIGS. therewith in which.

Figure 7:
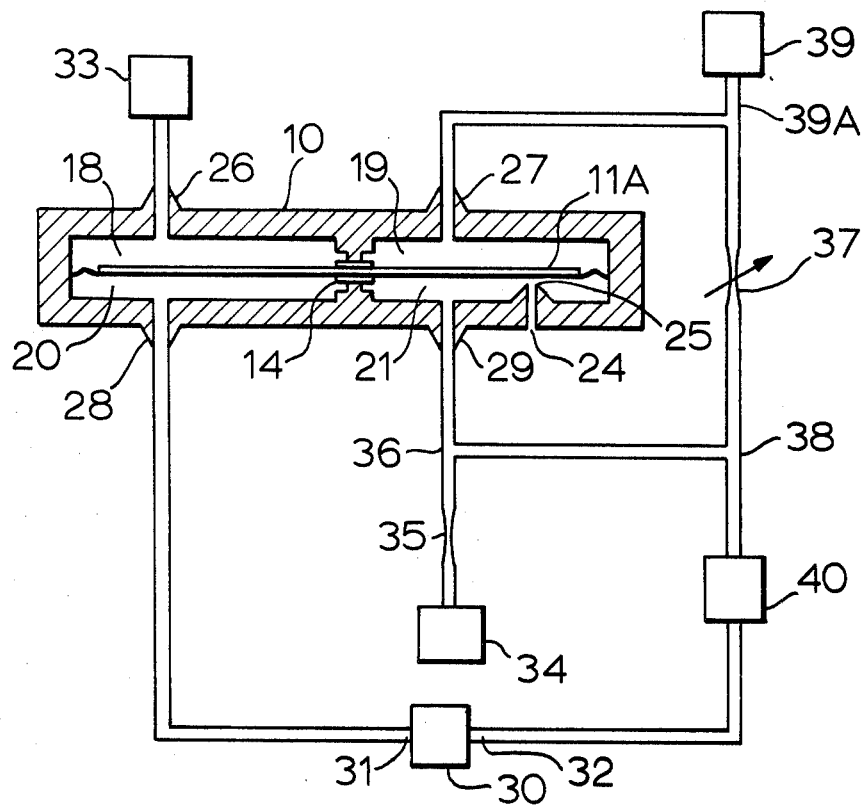
Figure 8:
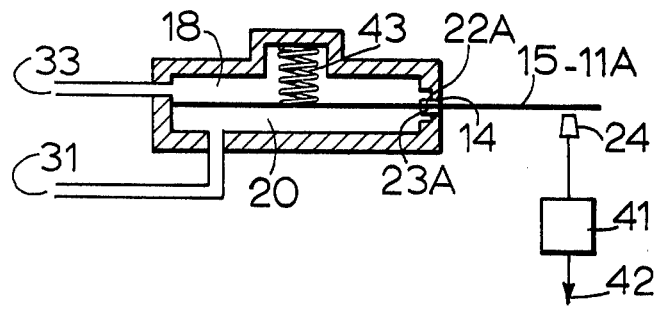

FIG. 7 diagrammatically illustrates a process control application of the amplifier embodiment;

FIG. 8 illustrates the application of the invention to simple proportional on-off types of control functions.

Figure 2:
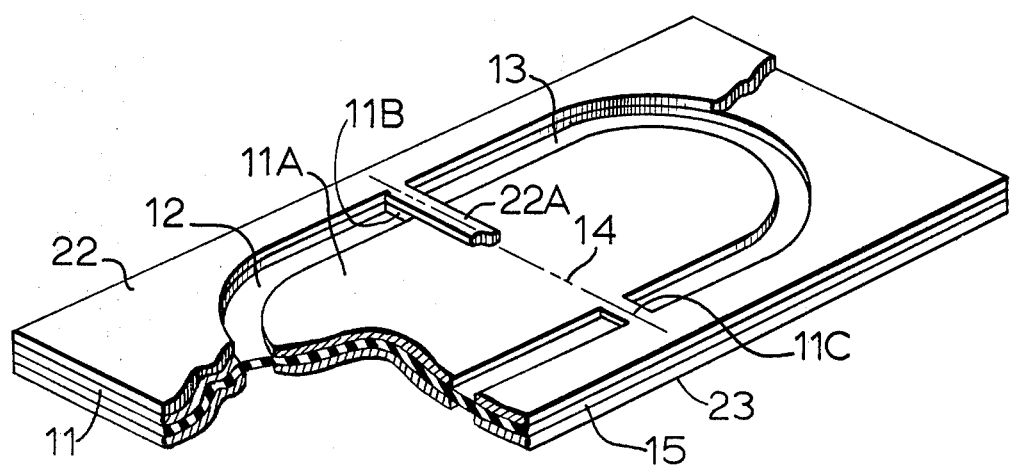
FIG. 2 is a three-dimensional view of an operator layer with a resilient layer and sealing gasket layers.

Referring to FIG. 2, metallic sheet layer 11 includes a centrally positioned pivoted operator 11A. Pivoted operator 11A is formed from metallic sheet 11 by an appropriate etching or blanking process, which process forms horseshoe-shaped perforations 12 and 13 through sheet 11 either side of fulcrum line 14. Perforations 12 and 13 are suitably offset from fulcrum line 14 so that pivoted operator 11A remains attached to the remainder of sheet 11 at pivot points 11B and 11C along fulcrum line 14. Pivot point attachments 11B and 11C conveniently serve as locating members for aligning pivoted operator 11A relative to the peripheral remainder of sheet 11; pivot point attachments 11B and 11C are not essential, but are of a special convenience in assembling the sandwich construction, and when provided, form part of the pivot seal configuration. Pivot point attachments 11B and 11C are designed to operate in torsion to permit rotation of operator 11A about fulcrum line 14, thereby displacing operator 11A from the plane of sheet 11.

The entirety of metallic sheet 11 including the area defined by perforations 12 and 13 and the area defined by operator 11A may be conveniently backed by a suitable sheet of resilient material such as elastomer 15, which elastomer 15 is bonded by suitable means to sheet 11 and operator 11A. Elastomer 15 provides pressure-type sealing between opposing surfaces of sheet 11 and operator 11A, that is, as between the surface not in contact with elastomer 15 and the opposite surface, which is in contact with elastomer 15. Elastomer 15 is sufficiently resilient to permit pivoting of pivoted operator 11A about fulcrum line 14. For a slight relative movement of pivoted operator 11A with sheet 11, elastomer 15 may be composed of a simple uniform elastic sheet of suitable material. For applications in which pivoted operator 11A requires a relatively large movement, elastomer 15 may be molded with a fold suitably conforming with the areas of perforations 12 and 13 in order to minimize the retarding effect of elastomer 15 upon pivoted operator 11A as it is rotated about fulcrum line 14.

Gasket layer 22 is disposed against the upper surface (as shown) of layer 11, while gasket layer 23 is disposed against the elastomer layer side. Each gasket, 22 and 23, has a pair of cutouts generally defined by the periphery of horseshoe perforations 12 and 13, with gasket extensions 22A and 23A bridging the region separating perforations 12 and 13 along fulcrum line 14.

Figure 3:
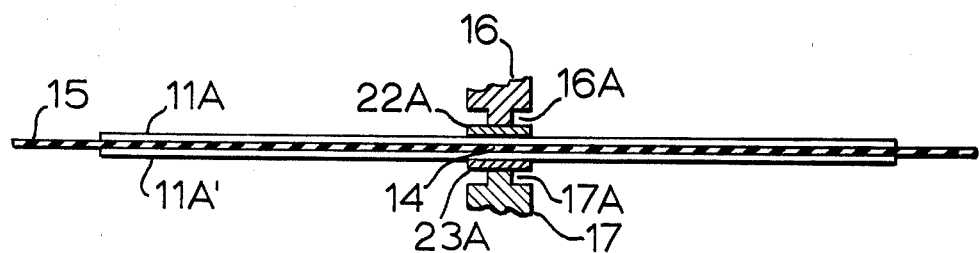
FIG. 3 is a cross-sectional view of a pivot sealing region.

The manner in which an operator is brought through the pivot sealing region of the sandwiched construction is more particularly shown in the view of FIG. 3. The operator 11A-15-KA' of FIG. 3 is an alternative construction, in which an additional metallic sheet 11' is bonded to the other side of elastomer 15, thereby forming a bonded metallic-elastomer operator 11A-15-11A'. This method of construction is suitable for applications requiring a higher degree of ruggedness and durability. It will be understood, however, that in the illustrated examples, the operator-elastomer combinations may be comprised of a single metal sheet 11 with an elastomer backing 15, or a dual metal sheet 11 and 11' with an intermediate elastomer 15, conveniently bonded together. Operator 11A-15-11A' is clamped on opposing surfaces along fulcrum line 14 by gaskets 22A and 23A respectively, which gaskets 22A and 23A are bridging portions of gasket layers 22 and 23 respectively. In turn, gaskets 22A and 23A are respectively clamped by ridges 16A and 17A which are portions of layers 16 and 17 respectively, more fully described below. Ridges 16A and 17A in contact with gasket bridges 22A and 23A should be sufficiently narrow so that rotational movement of operator 11A-15-11A' about fulcrum line 14 causes a fairly low resistance by the shear compression of gasket bridges 22A and 23A respectively. Gasket bridges 22A and 23A must be sufficiently resilient to accommodate the required rotational displacement of operator 11A-15- 11A'. Ridges 16A and 17A are conveniently made with a finite width for effective support and clamping of gaskets 22A and 23A, and in addition, to insure sufficient registration of opposing clamping regions about fulcrum line 14, notwithstanding variations in tolerances in pieces 17 and 16 which might tend to displace ridges 17A and 16A from each other along the length of operator 11A-15-11A'. This sealing combination provides for pivoting of operator 11A-15-11A' with a low spring rate.

Figure 4:
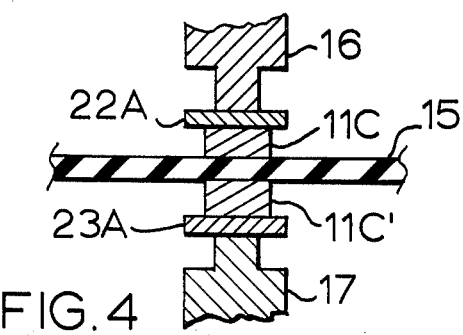
FIG. 4 is a cross-sectional view of a pivot sealing region at a pivot point attachment of an operator.

FIG. 4 illustrates a pivot sealing configuration in the region of pivot point attachment 11C, for example, in which the metal of layer 11 is necked down. Again, it may be seen that the finite cross-sectional dimensions of the components of the layers allow for a tolerance of registration so that effective sealing obtains despite variations in component dimensions.

Figure 5:
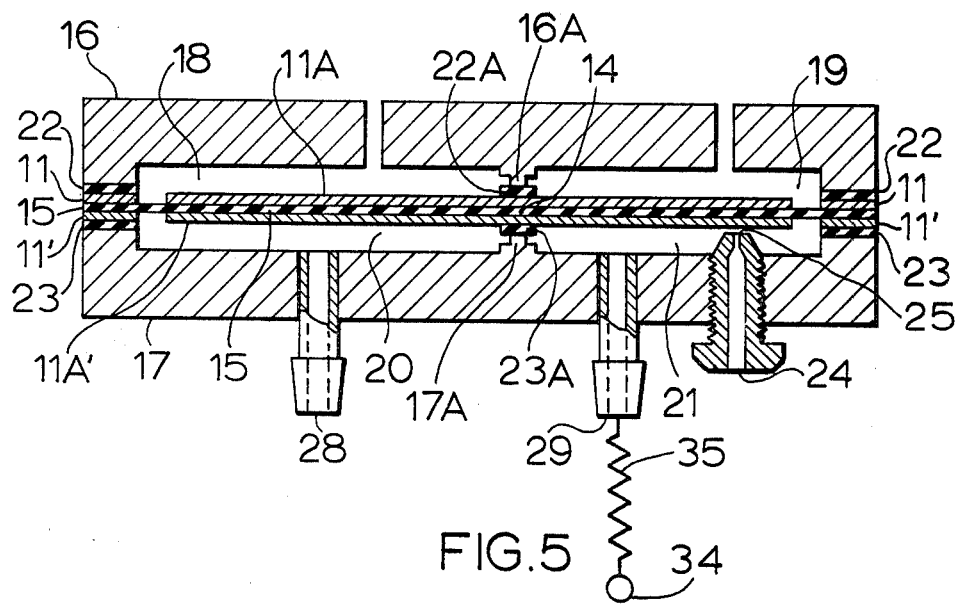
FIG. 5 is a cross-sectional view of a repeater embodiment of the invention.

Referring to FIG. 5, a simple embodiment of the invention is illustrated, performing the function of a repeater. A metal sheet and elastomer bonded combination 11–15–11A has a sealing gasket 23 provided between side 11A' and recessed plate 17, having recesses 20 and 21 therein on either side of fulcrum line 14. Plate 16 with gasket 22 is mounted to side 11A of the sheet-elastomer combination 11–15–11' and the total assemblage clamped together by suitable means vented recesses 18 and 19 are provided in plate 16 to permit rotational pivoted displacement of the operator 11A–15–11A' combination. Recess 20 forms a pressure chamber with an abutting portion of operator 11A, and recess 21 forms a pressure chamber with the portion of operator 11A abutting it. As operator 11A rotationally pivots about fulcrum line 14, the volume of chamber 20 is increased or decreased, while the volume of the chamber 21 decreases or increases inversely therewith. A throttling mechanism, such as a nozzle 24 is inserted into chamber 21, for sensing the displacement of operator 11A. A signal pressure, conveniently air, may be applied through connector 28 into chamber 20 with a consequent throttling effect upon nozzle 24 as a result of the rotational displacement of operator 11A in response to the signal pressure. If a source of air supply 34 is feed through a restrictor 35 to chamber 21 via connector 29 the throttling down of nozzle tip 25 by operator 11A–15–11A' increases the pressure in chamber 21. This pressure increase in chamber 21 will operate to rebalance operator 11A–15–11A'. The pressure in chamber 21 will be equal to the pressure in chamber 20 for equal effective areas of the chambers 20 and 21 as compared with one another. Should the fulcruming of operator 11A–15–KA' be offset as illustrated, so that the effective area chamber 20 is larger than the effective area 21, the pressures in chambers 20 and 21 respectively will differ for the rebalance condition, a correspondingly larger pressure being produced in chamber 21 than the signal pressure in chamber 20 for balance. Thus, the repeater gain may be determined by the effective areas selected for either side of fulcrum 14.

Figure 1:
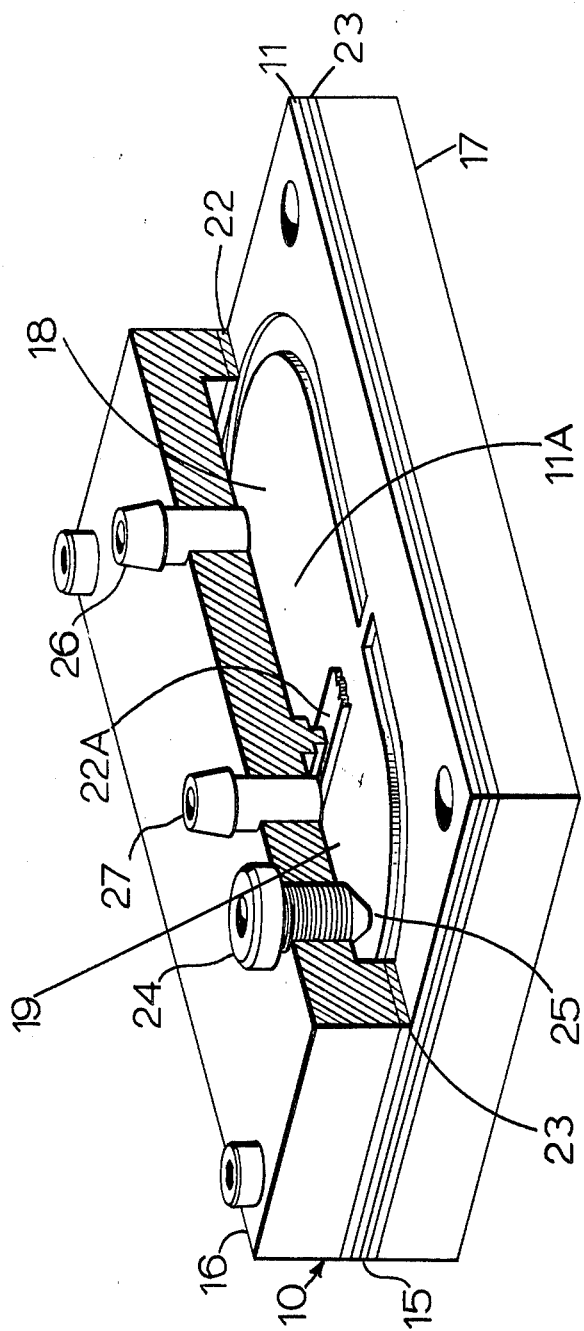
FIG. 1 is a three-dimensional cutaway view of an amplifier embodiment of the invention.
Figure 6:
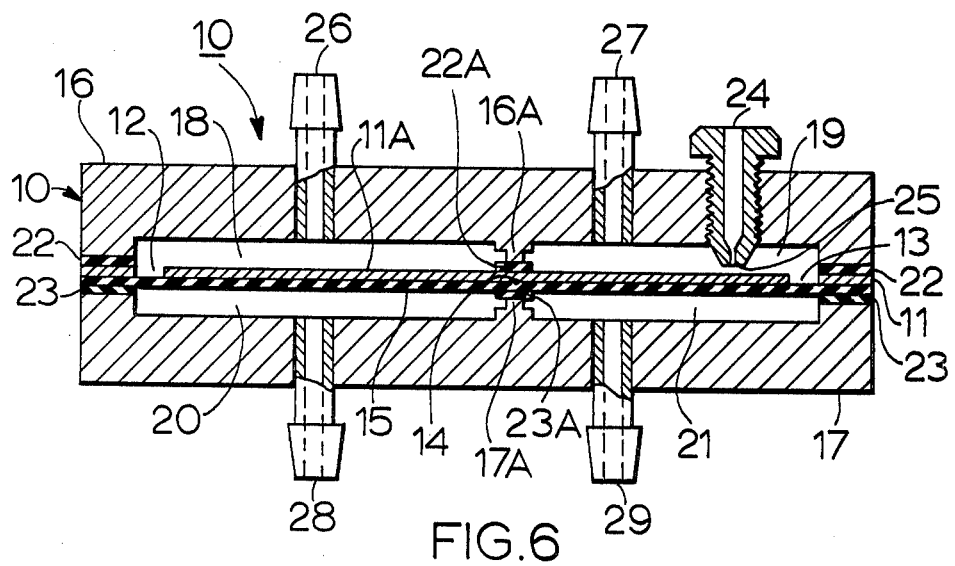
FIG. 6 is a cross-sectional view of an amplifier embodiment.

Referring to FIGS. 1 & 6, an embodiment of the invention is shown adaptable to applications requiring an amplifier. A metal sheet-elastomer bonded combination 11—15 is employed in conjunction with gaskets 22 and 23 and recess plates 16 and 17 to form a 4-chambered construction in which each chamber is pressure-isolated from one another. Gaskets 22 and 23 are disposed on either side of the metallic sheet 11 and elastomer 15 combination, gaskets 22 and 23 having cutouts generally conforming to the effective area of each chamber proximate the cutout. Gaskets 22 and 23 include bridges 22A and 23A respectively which are disposed adjacent the pivoted operator and elastomer combination 11A–15 along fulcrum line 14 on either side thereof. Plates 16 and 17 are clamped by any suitable means on either side of the layered combination of gasket 22 sheet 11, elastomer 15, and gasket 23. Plate 16 has recesses 18 and 19 therein, and plate 17 has recesses 20 and 21 therein. Recess 18 is disposed to face half of pivoted operator 11A on one side of fulcrum line 14, while recess 19 is disposed to face the half of operator 11A on the other side of fulcrum line 14; recesses 20 and 21 in plate 17 are disposed against the elastomer 15 surface of the operator-elastomer combination 11A–15, each recess 20 and 21 disposed against half of the pivoted operator 11A–15 on either side of fulcrum line 14. In general, the objective of the dispositions of each recess 18, 19, 20 and 21 is to form a pressure chamber with an abutting portion of the pivoted operator and elastomer 11A–15 combination. Sealing gasket 22 is formed to be generally peripheral to recesses 18 and 19 of plate 16 on the metallic sheet 11 side of the metal-elastomer combination 11–15. Sealing gasket 22 includes extension 22A along fulcrum line 14 to prevent leakage between recesses 18 and 19. Sealing extension 22A is effectively clamped by ridge 16A of plate 16. Sealing gasket extension 22A must be of such a flexible material so it may deform elastically to readily accommodate displacement of operator 11A. Operator 11A must be relatively stiff with respect to resistance from the sealing confinement along fulcrum line 14, as well as with respect to the effects of elastomer 15 and pivot point attachments 11A and 11C. These factors are to be considered in order to determine a satisfactory stiffness for operator 11A.

Sealing is also provided on the elastomer 15 side of sheet 11 by sealing gasket 23–23A, or alternatively, the sealing properties of elastomer 15 may be relied upon to provide effective sealing for recesses 20 and 21. In the latter case, gasket 23 is eliminated and elastomer 15 in conjunction with plate 17 abutting therewith provides the requisite sealing.

Air nozzle 24, for the amplifier application, is incorporated with recess plate 16 so that nozzle tip 25 abuts a selected portion of pivoted operator 11A; the proximity of nozzle tip 25 to operator 11A in its balanced null position is selected according to the application. Alternatively, other throttling devices may be employed for the feedback function such as will provide greater power capacity or greater sensitivity. For example, a ball seat valve, or a large seat throttle valve maybe employed instead of nozzle 24.

Pressure inlet connectors 26, 27, 28 and 29 communicate with recesses 18, 19, 20 and 21 respectively so that the sandwiched construction 10 may be employed in conjunction with suitable pneumatic circuitry for the desired application, as in a process controller. It will be evident, for example, that recesses 18, 19, 20 and 21 can perform the function of the bellows disclosed in U.S. Pat. No. 2,742,917. Each recess 18, 19, 20 and 21 forms a separate pressure chamber exerting its particular pressure upon the effective area of the portion of pivoted operator 11A proximate therewith. In this manner, functions may be performed that are similar to the application of a force by a conventional bellows against a balanceable pivoted member.

The structure of the embodiment shown in FIGS. 1 and 6, for example, provides that the effective areas on opposite surfaces of the pivoted operator and elastomer combination 11A–15 are equal, whatever the operator rotational displacement. That is, for example, the surfaces of pivoted operator 11A–15, intermediate chambers 18 and 20, always present an equal area to both chambers 18 and 20, although these areas may change slightly with rotational displacement of pivoted members 11A–15.

In a variation of the construction of the invention, elastomer 15 may be omitted if perforations 12 and 13 are made narrowly enough so that the leakage there through is insignificant in view of the application. For example, in most applications the rebalancing condition provides that pressures on opposing surfaces of pivoted operator 11A–15 are equalized. Therefore, a small amount of leakage through perforation 12, for example, may be permissible where pressures in chambers 18 and 20 are to reach an equality for the equilibrium condition. The requirement is only that the effective restriction afforded by perforation 12 be sufficient to provide some basis for control sensing to achieve the equilibrium condition. Alternatively, a narrowly etched perforation 12 may be sealed by a mercury or other liquid deposit which retains its position therein by surface tension. The effective area of the liquid seal may be sufficiently small with respect to the pressures employed that the liquid seal will not tend to be displaced appreciably. It may be calculated that if the cross-sectional area of perforations 12 and 13 are sufficiently small, such a mercury-type of seal will serve to isolate a large pressure range, although effectively restraining a differential pressure only by means of its viscosity and surface tension characteristics.

FIG. 7 illustrates in diagrammatic form the application of an amplifier embodiment of the invention, such as the embodiment of FIG. 6, to control of a process 30. Process 30 has a measurement signal 31 and a valve actuator signal 32, both in the form of air pressure signals. Measurement signal 31 is supplied via connector 28 to pressure chamber 20 of amplifier 10. A set point pressure signal 33 is supplied via connector 26 to pressure chamber 18. A supply pressure source 34, conveniently 20 p.s.i., is supplied through a restrictor 35, tee junction 36, and connector 29 to chamber 21. Air nozzle 24, here connected into chamber 21, exhausts to atmosphere, and acts as a throttling valve between chamber 21 and atmosphere; the throttling is determined by the relative spacing between operator 11A and nozzle tip 25. This throttling action controls the flow of air from chamber 21 to atmosphere, and in conjunction with restrictor 35 produces a pressure in chamber 21 proportioned between supply pressure and atmosphere; the pressure in chamber 21 balances the difference between set point and measurement pressures. Chamber 19 is connected via connector 27, tee junction 39A, variable restrictor 37, and tee junctions 38 and 36 to chamber 21, junctions 36 and 38 thus being the output signal junctions. Pneumatic capacity 39 is connected into tee junction 39A. This arrangement with chamber 19 performs the integrating function of a conventional pneumatic controller. The controller output signal is taken from tee junction 38 and supplied through a repeater device 40 providing the valve control signal 32 to process 30. Repeater 40 may provide power amplification sufficient to position the process valve.

In operation, a difference between setpoint pressure 33 and the pressure of process measurement signal 31 appearing in chambers 18 and 20 respectively tends to unbalance operator 11A from its null position. In response, nozzle 24 throttles the pressure in chamber 21 to provide a proportioned output signal to repeater 40, which actuates the process valve in a manner tending to bring the process 30 measurement signal 31 back towards the set point pressure 33. If there is a time delay in achieving the return of measurement signal 31 to the set point pressure 33, an integrating function is performed by chamber 19, wherein the output signal from chamber 21 is incremented according to a time integral determined by restrictor 37 and capacity 39 until such a valve positioning of process 30 is achieved which thus establishes process measurement 31 at set point pressure 33, thus returning the operator 11A to a null balance position.

The gain of amplifier 10 is determined by the location of fulcrum line 14 along the long dimension of operator 11A, whether, for example, at its center or offset towards one end thereof, as exemplified in FIG. 5. An offset of fulcrum line 14 gives a preponderance in effective area to one set of chambers 18—20 as opposed to the other set 19—21, so that for deviations from a null position the relative pressures will differ in proportion to the effective area differential. The ratio of effective areas determines proportional band or gain of the device. Alternatively, or in addition, the configuration of operator 11A may be wider on one side of fulcrum 14 relative to its width on the other side, thereby affecting the relative effective areas.

In a simplified embodiment of the invention, illustrated by FIG. 8, a single pressure chamber 20 is used in conjunction with an opposing spring 43 in place of a signal pressure supplied to opposing chamber 18. Spring 43 provides an effective reference signal pressure. The measurement signal pressure 31 supplied to chamber 20 may be either higher or lower than the referenced pressure exerted by spring 43. Accordingly, a high signal pressure 31 will cover external nozzle 24, while a signal pressure 31 lower than the reference provided by spring 43 uncovers nozzle 24. The output of nozzle 24 is proportional to the deviation measurement pressure from the reference spring setting. The embodiment of FIG. 8 shows that operator 11A may be brought out from a pressure chamber through the pivot seal region at fulcrum 14 to influence some external device, such as a flapper-nozzle.

Various embodiments are illustrated to show that the invention does not reside in the number of chambers employed, but rather in the layered construction and the advantages derived therefrom, namely a sandwich configuration providing one or more pressure chambers disposed with respect to a pivoted operator which operator is brought through a sealing region formed as part of the layered construction.

FIG. 8 may also represent an application employing only a pair of opposed chambers 18 and 20 for setpoint and measurement, together with a sensing nozzle 24 and a relay 41, for an on-off controller. Again, pivoted operator 11A extends on either side of fulcrum 14, one side being intermediate chambers 18 and 20 with the other extending side of pivoted operation 11A being open to atmosphere. Nozzle 24 together with relay 41 senses whether the set point pressure 33 is higher than a measurement pressure 31, which condition uncovers the nozzle 24, while measurement pressure greater than the set point pressure covers the nozzle. Accordingly, output 42 from relay 41 is a high-low signal indicating the relative condition of setpoint and measurement signals supplied to chambers 18 and 20 respectively.

The present invention is not limited to the embodiments described above, but extends to any embodiment employing a pivoted operator in conjunction with a layered sealing construction as exemplified herein. The various layers of the sandwiched construction are most conveniently planar, in that planar layers are easier to fabricate and assemble. However, the invention is not limited to planar configurations of the layered construction, but is intended to extend to any convenient or desirable curvature of layers, such as may be assembled into the construction of the invention. Therefore, the embodiment may exhibit any form of curvature compatible with the application intended, the planar configuration not being essential.

The pivoted operator layer has been described above as fabricated from a metallic sheet. However, any material may be used convenient to the application, such as glass, plastic, or some type of composite. The only requirement is that the pivoted operator be sufficiently rigid considering the application, to transfer movements through the pivoted sealing region. The operator layer may be made from a plastic molding, which instead of a perforation therethrough to separate the pivoted operator portion from the remainder provides for a relief between the pivoted operator and the peripheral remainder of the operator layer, such as will allow relative movement between the pivoted operator and the peripheral layer. In this molded form of operator layer, the sealing between either surface is furnished by the relief region, which extends sufficiently into the operator layer to afford resiliency in the relief region, while the pivoted operator itself has sufficient thickness to provide the requisite stiffness for the application. Similarly, the operator layer may be made from a sheet in which a corrugating process is performed, which produces a layer having a corrugated compliance region between the pivoted operator and the peripheral remainder of the sheet. Thus, sealing may be inherent in the fabrication of the operator layer, is a flexible sealing region being provided by the corrugating process. Therefore, it is to be pointed out the invention does not reside in any particular method of forming a pivoted operator and sealing layer, such as is exemplified above, but extends to any operator layer having provision for relative movement of a pivoted operator with the remainder of the operator layer. Again, in some applications such as balance types complete sealing may not be required between either surface of the operator layer, and it is contemplated that operator layers may be fabricated having only partial or restrictive sealing between the surfaces of the operator layer, as effected by the region between the operator itself and the peripheral remainder.

Similarly, the term resilient employed above, with respect to a resilient sealing gasket, is relative, and any material which is in effect more resilient than the pivoted operator may be employed, such as metal gaskets which will exhibit sufficient compliance and elasticity to permit a relatively stiff pivoted member to produce movement through the sealing region to the other side. In this respect, it is only required that the pivoted operator be sufficiently stiff with regard to the components of the sealing region that motion may be transferred. For example, in very high pressure applications such as may be employed in conjunction with steam processes it is contemplated that metal layers exhibiting elasticity to some extent may be employed for the sealing layers, while the pivoted operator be constructed of a sufficiently stiff material, or alternatively, that the operator be sufficiently large in cross-sectional area, to adequately transfer motion through the sealing region. For example, the operator itself may have a large cross section which will permit sufficient deformation in its surface region in association with a sealing gasket layer so that motion may be conveniently transferred through the pivoting seal region. Thus, the invention does not reside in the particular materials employed in the various layers of the construction, but rather in the combination of a pivoted member extending through the sealing region which is formed as part of the layered construction itself, with the configuration and shape, and the materials employed being adaptable to the desired embodiment and application.

Again, the shape of the pivoted member as illustrated is convenient for the embodiments described, but may be of any shape as is suitable, and may be made with any convenient effective area desired. The respective halves of the pivoted member with respect to its fulcrum line may be quite dissimilar and may exhibit any of a variety of configurations, the invention not being limited to any particular shape, the recessed plates may be made of any material, and may be of any shape, so long as they afford adequate support for the sandwiched construction and for the application employed.

While there has been shown what is considered to be a preferred embodiment of the invention, it will be manifest that many changes and modifications may be made therein without departing from the essential spirit of the invention.

What we claim is:

1. A pressure device having a layered construction and comprising:
    an operator forming at least part of one layer thereof;
    said layered construction including wall means cooperating with one portion of said operator to define therewith a fluid pressure chamber; and
    said layered construction further including fulcrum means for said operator adjacent a region thereof between said one portion and a second portion thereof extending away from said fluid pressure chamber, said fulcrum means sealingly supporting said operator for pivotal motion with respect to said wall means at said region.

2. A pressure-responsive device comprising:
    a pivotable operator;
    wall means cooperating with one portion of said operator to form a fluid pressure chamber;
    fulcrum means for said operator adjacent a region thereof between said one portion and another portion thereof remote from said fluid pressure chamber;
    said fulcrum means sealingly supporting said operator for pivotal movement with respect to said wall means at said region.

3. The device of claim 2, wherein said pivotable operator is a relatively thin, flat element having a substantial area.

4. The device of claim 3, including a resilient sealing member along one side surface of said operator to isolate the two sides of said operator while permitting pivotal movement thereof.

5. The device of claim 4, including second wall means cooperating with said one portion of said operator to form a second fluid pressure chamber on the side of said operator opposite to said first chamber.

6. The device of claim 5, including third wall means cooperating with said other portion of said operator to form a third fluid pressure chamber.

7. The device of claim 2, including a pneumatic means in said fluid pressure chamber cooperable with said operator to produce a desired effect.

8. The device of claim 7, wherein said pneumatic means comprises a pneumatic nozzle the air flow through which is determined by the positioning of said operator.

9. A pressure device having a layered construction and comprising:
    a pivotable operator in a first layer;
    means pivotally supporting and sealing said operator at a region between two adjacent portions thereof to provide for pivotal movement of said operator about an axis in said region; and
    means serving with one of said operator portions to form a sealed pressure chamber;
    whereby said operator can by its pivotal movement transmit motion between said pressure chamber and a region outside of said pressure chamber without disturbing the pressure integrity of said chamber.

10. In a pressure device, a layered construction comprising:
    a pivotable operator forming at least part of a first layer;
    a resilient sealing layer adjacent said operator to prevent fluid flow from one side of said operator to the other side while permitting pivotal motion of said operator transversely with respect to said sealing layer;
    wall means defining a recess and cooperating with a portion of said operator and said sealing layer to form a pressure chamber; and
    means mounting said operator for pivotal motion at a sealing region between said one operator portion and a second portion thereof outside of said pressure chamber.

11. In a pressure device, a sealing configuration for pivoting an operator, comprising:
    first and second resilient sealing gaskets disposed against opposing surfaces of said operator in a region thereof intermediate two opposite ends of the operator;
    relatively rigid clamping means pressed against said resilient gaskets, the combination of said rigid clamping means and said resilient sealing gaskets forming a resilient pivoting seal for said operator and isolating pressures either side of said operator region whereby movement imparted to said operator on one side of said resilient pivoting seal is pivotally transferred to the other side thereof.

12. In a pressure device, a layered construction comprising:
    a first layer formed to provide an outer section and an interior operator element attached to the outer section at opposite points defining a pivot axis;
    a second layer comprising resilient material next to said operator to seal the spaces between said operator and said outer section while permitting pivotal movement of said operator about said axis;
    sealing layers disposed adjacent the opposite surfaces of the composite member represented by said operator layer and said resilient layer associated therewith;
    support means adjacent said sealing layers to hold said operator for pivoting movement in a region intermediate two portions thereof; and
    wall means disposed adjacent said sealing layers respectively and forming recesses on opposite sides of said pivoting region, said wall means serving in combination with a portion of said pivotable operator to form pressure chambers on opposite sides of said operator, said sealed pivoting region serving to isolate said pressure chambers from other portions of said pivotable operator remote from said pressure chambers.

13. A pressure device having a layered construction and comprising:
    a pivotable operator forming at least part of a first layer;
    a second layer adjacent said first layer and formed with at least one recess alongside of one portion of said operator to permit transverse movement of said one portion in the space of said recess;
    support means gripping said two layers in a region of said operator between said one portion and an adjoining second portion thereof while providing for pivotal movement of said operator about an axis in said region; and
    means forming part of said support means to seal said operator region to isolate said one portion from said second portion to permit said operator to transmit movement through said region while maintaining the pressure integrity of said recess.

14. A pressure device comprising:

a thin sheet of relatively stiff, springy material formed with openings defining an outer section and an interior operator section pivotally attached to said outer section at a region between two portions of said operator section;

resilient sealing means adjacent said region to provide sealing between said two operator portions while permitting pivotal movement of said operator about the pivot axis in said region; and means cooperating with one portion of said operator to define a pressure chamber one wall of which is said one operator portion.

15. The pressure device of claim 14, wherein said openings are approximately horseshoe shaped and located opposite one another to define a generally tongue-shaped operator section pivotally connected to said outer section at two opposite points intermediate the ends of said operator section.

16. The pressure device of claim 14, including a thin sheet of resilient material lying next to said sheet of springy material and overlying the openings to isolate the two sides of the operator.

17. The pressure device of claim 30, including additional means cooperating with said one operator portion to define a second pressure chamber opposite said first pressure chamber and having said one operator portion as a common wall therebetween.

18. A pressure device comprising:

a pivotable operator having two adjacent portions at least one of which presents along one side thereof a pressure-receiving surface;

means at a region between said two adjacent portions for pivotally supporting and for sealing said operator to provide for sealed pivotal movement of said operator about an axis between said two adjacent portions; and means cooperating with said pressure-receiving surface of said one operator portion to define a pressure chamber the pressure of which is applied to said surface to develop a force thereon tending to pivot said operator about said axis;

whereby said operator can transmit mechanical force through said sealed region without disturbing the pressure integrity of said chamber.

19. A pressure device as claimed in claim 18, wherein said cooperating means includes wall means extending along the peripheral edge of said one operator portion and spaced a small distance therefrom to accommodate movement of said one operator portion.

20. A pressure device as claimed in claim 19, including a layer of resilient material overlying the gap between said wall means and said peripheral edge to effect a fluid seal while accommodating movement of said one operator portion.

21. A pressure device as claimed in claim 18, including means to apply a second pressure to a second pressure-receiving surface on the side of said one operator portion which is opposite said one side, whereby said operator transmits through said sealed region a force responsive to the comparative pressure differential between said two sides; and means adjacent said other operator portion to sense any movement of the other operator portion and to produce a signal responsive to said pressure differential.

22. A pressure device as claimed in claim 21, wherein said two pressure-receiving surfaces are of equal effective area.

23. A pressure device as claimed in claim 21, including feedback means under the control of said sensing means for applying a feedback force to said operator to maintain the position thereof substantially constant.

24. A pressure device as claimed in claim 18, including sensing means for developing a signal responsive to movement of said operator about said axis.

25. A pressure device as claimed in claim 24, wherein the other operator portion presents along one side thereof a second pressure-receiving surface; and means cooperating with said second pressure-receiving surface to define a second pressure chamber the pressure of which is applied to said second surface to develop a force thereon tending to pivot said operator about said axis and opposing the effect of the force developed by the pressure in said first chamber.

26. A pressure device as claimed in claim 25, including means for applying to said second chamber a pressure controlled by said sensing means to develop negative feedback action and to provide for amplification of a pressure signal applied to said first chamber.

27. A pressure device as claimed in claim 26, including means to apply to said first chamber a pressure corresponding to the value of a process condition to be regulated; and means for developing for a process control element a control signal responsive to the output signal of said sensing means, whereby said pressure device serves as a process controller.

28. A pressure device as claimed in claim 18, wherein said pivotable operator is formed from a thin sheet of relatively stiff material with each of said two adjacent portions presenting a pair of opposing equal-area pressure-receiving surfaces;

said cooperating means comprising first and second rigid plates cooperating with all of the pressure-receiving surfaces of said operator individually to form four respective separate and pressure-isolated chambers.

29. A pressure device as claimed in claim 28, including means for applying to two of said chambers respective pressure signals corresponding to measurement and set values for a process condition to be controlled; and sensing means responsive to movement of said operator for developing a control signal for a process control element influencing the magnitude of the controlled process condition.

30. A pressure device as claimed in claim 29, including means under the control of said sensing means for applying to at least one of the remaining two chambers a pressure signal providing feedback action.

31. A pressure device as claimed in claim 30, wherein said sensing means includes a pneumatic nozzle in one of said remaining two chambers.